April 22, 1941.   E. G. SACHS   2,239,402
LIQUID LEVEL INDICATING IMPLEMENT FOR TANKS
Filed Aug. 25, 1938
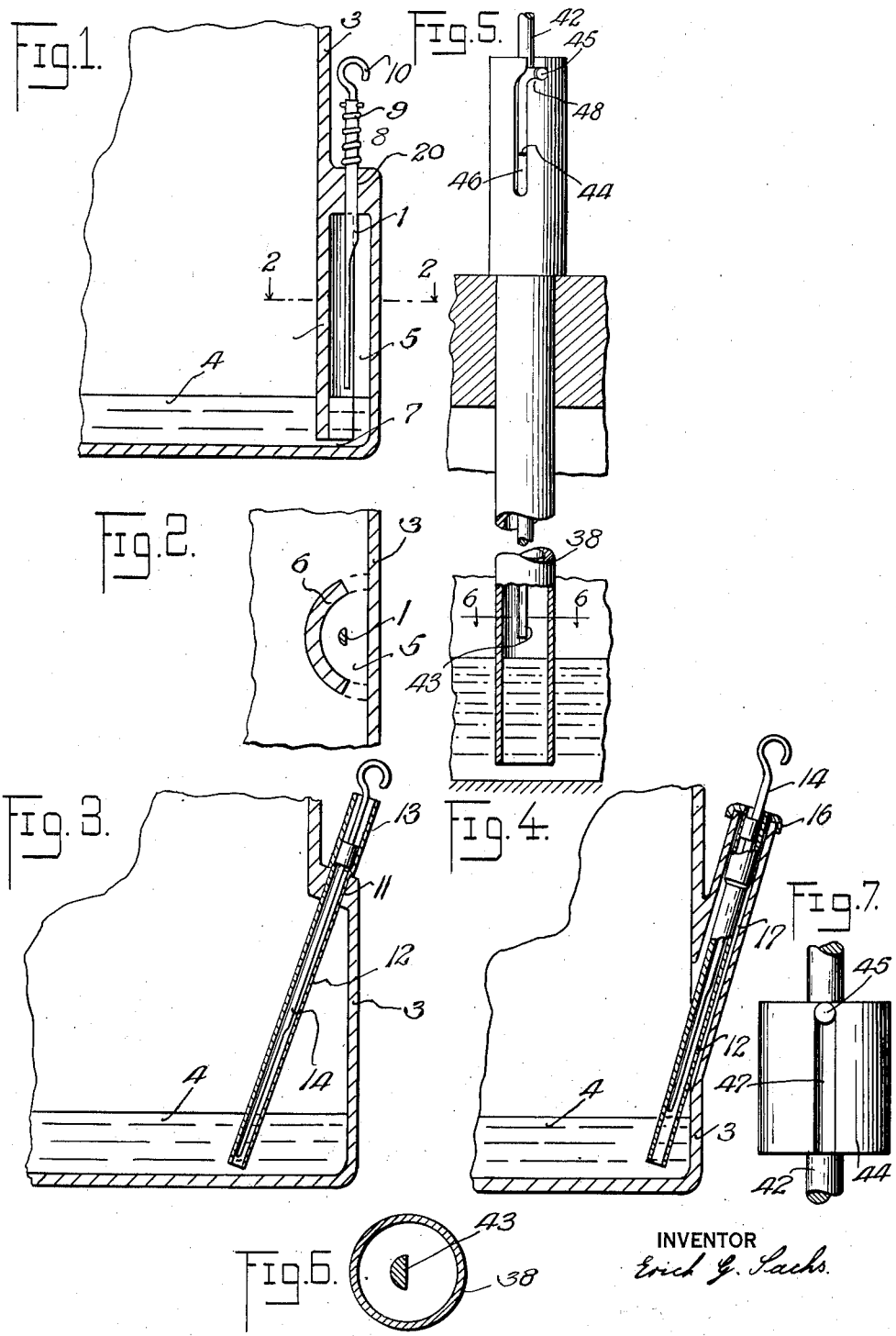
INVENTOR
Erich G. Sachs Patented Apr. 22, 1941

2,239,402

UNITED STATES PATENT OFFICE 2,239,402

LIQUID LEVEL INDICATING IMPLEMENT FOR TANKS

Erich G. Sachs, New York, N. Y.

Application August 25, 1938, Serial No. 226,786
In Germany August 26, 1937

1 Claim. (Cl. 33—126.7)

This invention relates to an improved device for measuring the oil level in the crank case of motor cars. More particularly the invention relates to measuring devices of the type containing a measuring stick having a handle and a measuring portion which is provided with marks and can be dipped into the liquid to be measured. By means of such marks the liquid level can be checked when the stick is pulled out again of the liquid.

The object of the invention is to expedite and facilitate the checking of the oil and to render the operation clean as compared with the measuring devices employed up to the present. This is attained by supporting the measuring stick, when not in use, in a position raised above its lowest, measuring position, and by providing means for protecting the stick from oil splashes inside the crank case which deposit on all that part of the measuring stick projecting into the crank case if the stick is not protected.

It is not possible to read the oil mark on a stick which is splashed with oil, unless the stick is first wiped off. The stick according to the invention however cannot be reached by the oil splashes as it is protected against such splashes, and a vertical movement of the oil in the crank case cannot reach the reading zone of the stick, as this zone is raised far enough above the oil level. For checking the oil level by means of the new device the user has therefore only to push the improved measuring stick down into its measuring position, pull it out of the case, and read the oil mark without first wiping off the stick.

The invention is illustrated in the accompanying drawing, this drawing being however purely illustrative and in no manner limitative.

In the drawing:

Fig. 1 shows a diagrammatic vertical section through an embodiment of the invention, Fig. 2 is a horizontal cross section taken along line 2—2 of Fig. 1, Figs. 3 and 4 show diagrammatic vertical sections through other embodiments of the invention, Fig. 5 shows a vertical section through a further embodiment of the invention, Fig. 6 is a horizontal cross section taken along line 6—6 of Fig. 5.

Similar numerals refer to similar parts throughout the various views.

In Figs. 1 and 2 the measuring stick 1 is arranged in a hole 2 of the crank case 3 which contains the oil 4 the level of which is to be checked. Inside of the crank case 3 a small compartment 5 is partitioned off by a wall 6 which is arranged in the case in such way that the compartment 5 extends from the hole 2 downwards and communicates with the rest of the case at least near its bottom by an opening 7.

As illustrated in Fig. 1 the measuring stick 1 is arranged in a raised position. For this purpose a compression spring 9 may be arranged around the upper end of the stick 1, and may be fastened with its upper end at the stick. The lower end of the spring 9 rests upon the crank case. The upper portion 8 of the stick is enlarged in order to fit slidably the hole 2. A handle or hook 10 is provided at the upper end of the measuring stick.

The bow-shaped wall 6 protects the measuring stick 1 from oil splashing in the crank case. It is not necessary that the wall 6 is connected with its sides to the wall of the case 3 as long as the wall 6 is wide enough to protect the measuring stick 1 from the oil. But it may be connected as shown by dotted lines. The wall 6 may be attached to the case 3 in any suitable manner, e. g. by welding, by screws or by being cast in one with the case. The raised position of the measuring stick is preferably chosen at a level in which the stick does not dip into the oil even when the latter is at its highest level.

When the oil level is to be checked the stick must be pushed down so that spring 9 becomes completely compressed. When the spring is compressed the measuring stick is in its lowest, measuring position in which the oil level can be checked. Since the stick is clean, i. e. not covered with oil, it would be useless to pull it first out of the case and to wipe it off, as is necessary with other measuring sticks. After having pushed the stick into its lowest, measuring position it is pulled out and the oil mark may be read immediately. The oil having been checked the stick is placed again into its raised position in which it is supported by the compression spring 9 as shown in Fig. 1. The stick remains in this position until the next checking operation.

According to Fig. 3 of the drawing a tube 12 is mounted e. g. with push fit in the hole 11 of the crank case 3 and has an upper enlarged portion 13 resting on the wall of the crank case. The measuring stick 14 is arranged inside tube 12 and has means for supporting it in a raised position in tube 12, which means will be fully explained later on. E. g. the stick may be supported in the manner illustrated in Fig. 5.

In the embodiment of the invention shown in Fig. 3 tube 12 represents the wall protecting the stick against splashing oil which tube may also be permanently fastened in the hole 11 or form a continuation of said hole. It should usually remain in the hole, whereas the measuring stick is moved for oil checking operation.

Tube 12 may be of such a size and shape that it can be positioned in that opening of a crank case which has previously directly accommodated a measuring stick. With this arrangement a set or unit consisting of the tube and the measuring stick can be made available as an accessory which is to replace a measuring stick of the prior art.

Fig. 4 shows a modification of the invention according to which a tube 12 is attached to the oil filler cap which covers the filling hole 17 of the crank case. The unit comprising tube 12, cap 16, and measuring stick 14 is adapted to be substituted at a crank case previously equipped with a measuring stick of the old art. When oil is to be filled into the crank case the whole unit may be removed.

Figs. 5, 6 and 7 show a detailed illustration of an embodiment of the invention as generally illustrated by Fig. 3. A tube 38 is arranged in the hole 39 of the crank case 40 and rests upon the crank case by way of its enlarged upper portion 41. The measuring stick consists of a rod 42 the lower end 43 of which has a crescent shaped cross section (Fig. 6) in order to facilitate the reading of the oil mark and to prevent that the oil is wiped off during the pulling out of the stick through tube 38.

A plug 44 (Fig. 7) is rigidly attached to the stick 42 in any suitable manner. The outside diameter of this plug 44 is the same as the inside diameter of the enlarged upper portion 41 of tube 38, so that the plug can slide in this upper portion. A pin 45 provided on the plug serves as intermediate stop as well as an end stop. A vertical slot 46 is provided in the upper portion 41 of tube 38 said slot clearing the way for pin 45, when the measuring stick is moved. The slot 46 has a horizontal offset portion 48 near its upper end in which portion the pin 45 rests when the stick is in its raised position.

In using this modification of the invention it is merely necessary to rotate the measuring stick by a small angle so that the pin 45 is removed from its upper support. Then the stick may drop until the pin 45 is checked at the bottom of the slot 46 which defines the measuring position of stick 42. In order to prevent that the stick acts as a pump vents may be provided. As shown in Fig. 7 a groove 47 may be provided extending vertically downwards from the pin 45 which groove coincides with the slot 46 when the stick is moved so that air can pass through the groove and the slot.

Of course details of several embodiments of the invention shown in the drawing by way of examples may be combined within the scope of the invention, e. g. the spring shown in Fig. 1 may be used in connection with a measuring stick extending from the oil filler cap as shown in Fig. 4.

What I claim is:

In a device for measuring the oil level in the crank case of motor cars, a measuring stick having a handle and a measuring portion adapted to be inserted into said crank case and provided with marks at its lower end, which marks serve to indicate the distance to which the stick is wetted when dipped into the oil in the crank case, a narrow protective compartment for said stick extending in the crank case from a hole in the crank case downwards at least to the lowest oil level to be measured, said compartment being open at both of its ends and normally enclosing said measuring portion of said measuring stick, and supporting means for releasably suspending said measuring stick, when not in use, in said compartment in a position raised above its lowest, measuring position, the lower end of said measuring portion being above the lower end of said compartment when said stick is in said raised position, the measuring portion being partly wetted by the oil in the crank case when the stick is lowered from said raised position to a lowest, measuring position, said stick being also completely withdrawable from the crank case for inspection of the wetting thereof.

ERICH G. SACHS.